Patented Oct. 1, 1929

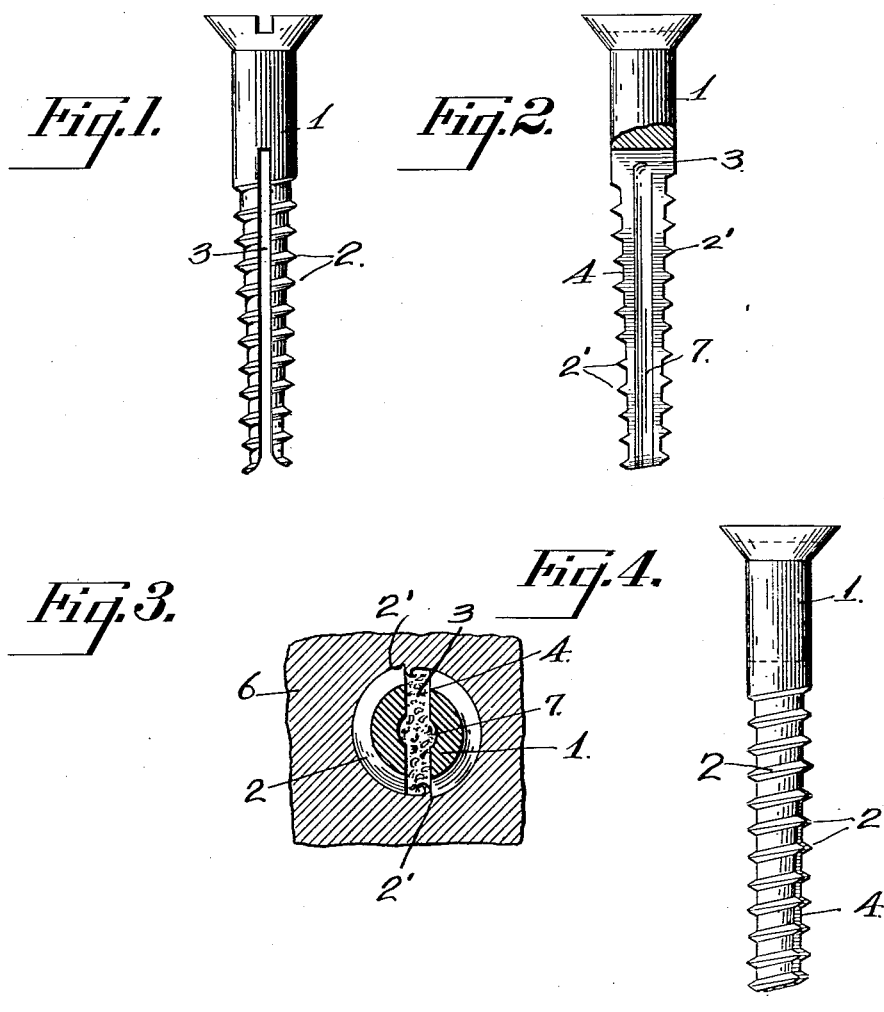

1,729,670

UNITED STATES PATENT OFFICE

CLARK K. HOLLAND, OF SACRAMENTO, CALIFORNIA

WOOD SCREW

Application filed January 23, 1929. Serial No. 334,512.

My invention relates to improvements in wood-screws wherein a centrally disposed longitudinal slot separates the shank of said screw into a pair of spaced bifurcated members, which members are bent away from each other to provide extended cutting teeth and edges whereby a threaded bore may be provided for said screw when introduced into a board or piece of wood or other material.

The primary object of the present invention is to provide a new and improved wood-screw.

Another object of the invention is to provide a new and improved wood-screw having improved means for cutting a threaded bore for the reception of said screw while being introduced into a piece of material.

A further object of the present invention is to provide a wood-screw as above described having a centrally disposed longitudinal slot to produce a pair of bifurcated members bent away from each other in the plane of said slot to form extended cutting edges and teeth to cut a threaded bore for the reception of said screw.

A still further object is to provide a new and improved wood-screw of the type set forth, wherein the material removed from the bore will be pressed into said slot to expand the bifurcated members and thereby tightly press the same against the sides of the bore for the purpose of normally resisting removal of said screw from said bore.

I accomplish these and other objects by means of the improved device disclosed in the drawings forming a part of the present application in which like characters of reference are used to designate similar parts throughout the specification and drawings, and in which—

Fig. 1 is an elevation of my improved wood-screw;

Fig. 2 is a broken side elevation of Fig. 1 disclosing the cutting edges and teeth in profile;

Fig. 3 is an enlarged sectional view disclosing the manner in which the wood-screw cuts its own bore while being introduced into a piece of material; and Fig. 4 is an elevation disclosing the manner in which the cutting edges and teeth are advanced or extended to facilitate the cutting or boring operation of the device.

Referring to the drawings the numeral 1 is used to designate a standard type of wood-screw having the usual thread 2 thereon. The screw 1 is provided with a diametrically disposed longitudinal slot 3 which slot 3 produces a pair of bifurcated members with flat adjacent surfaces whose edges present teeth 2' in profile, which teeth 2' are provided by the intersection of the slot 3 with the thread 2, as well as the cutting edges 4, as disclosed in Fig. 2 of the drawings.

These bifurcated members are bent laterally or away from each other in planes parallel to the slot 3 so that the advanced or foremost edge of each member will extend beyond the adjacent edge of the opposite member, thereby providing a plurality of cutting teeth 2' and cutting edges 4 projecting beyond the contour of the said opposite member, as disclosed in exaggerated position in Fig. 4 of the drawings.

In operation, the screw 1 is inserted and screwed into the material 6 in the usual manner, and while being screwed into said material the extended teeth 2' and cutting edges 4 will cut or bore for the reception of the said screw 1. As the material is cut by said teeth 2' and edges 4, said removed material will be forced into the slot 3, as disclosed in Fig. 3 of the drawings, and thereby tend to expand the bifurcated members and cause the same to tightly impinge and press against the inner wall or surface of the bore and thereby normally resist removal.

The screw 1 may be provided with a central bore 7 which bore 7, acting in conjunction with the slot 3, will provide arcuate cross sections for each member of the screw to provide a cross section of greater strength, and at the same time provide a recess of greater capacity for the storing and reception of the material removed from the bore while the screw is being introduced.

Having thus described my invention what I claim as new and desire to secure by Letters Patent is—

A wood-screw having a centrally disposed longitudinal slot to provide a pair of bifurcated members having cutting teeth and edges thereon, said bifurcated members being bent laterally away from each other along planes parallel to the plane of the slot whereby one edge of each member will project beyond the adjacent edge of the opposite member to provide extended cutting teeth and edges whereby a threaded bore may be cut by said extended teeth and edges for the reception of said screw.

In witness whereof, I hereunto set my signature.

CLARK K. HOLLAND.